US012482392B2

(12) United States Patent
Park et al.

(10) Patent No.: US 12,482,392 B2
(45) Date of Patent: Nov. 25, 2025

(54) DISPLAY DEVICE

(71) Applicant: SAMSUNG DISPLAY CO., LTD., Yongin-si (KR)

(72) Inventors: Geonhwi Park, Anyang-si (KR); Kihyun Pyun, Gwangmyeong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 32 days.

(21) Appl. No.: 18/172,391

(22) Filed: Feb. 22, 2023

(65) Prior Publication Data

US 2023/0401989 A1 Dec. 14, 2023

(30) Foreign Application Priority Data

Jun. 14, 2022 (KR) ........................ 10-2022-0072396

(51) Int. Cl.
*G09G 3/20* (2006.01)

(52) U.S. Cl.
CPC ......... *G09G 3/2007* (2013.01); *G09G 3/2096* (2013.01); *G09G 2320/0276* (2013.01); *G09G 2320/041* (2013.01); *G09G 2320/0666* (2013.01); *G09G 2360/16* (2013.01)

(58) Field of Classification Search
CPC ............... G09G 3/2007; G09G 3/2096; G09G 2320/0276; G09G 2320/041; G09G 2320/0666; G09G 2360/16
See application file for complete search history.

(56) References Cited

U.S. PATENT DOCUMENTS

| | | | | | |
|---|---|---|---|---|---|
| 6,862,029 | B1 * | 3/2005 | D'Souza | H04N 17/04 345/11 |
| 7,688,304 | B2 * | 3/2010 | Park | G09G 3/3648 345/204 |
| 8,144,085 | B2 * | 3/2012 | Mori | G09G 3/3225 345/83 |
| 10,347,211 | B2 * | 7/2019 | Lee | G09G 5/06 |
| 2006/0285025 | A1 * | 12/2006 | Yoshida | G09G 3/20 349/8 |
| 2007/0286480 | A1 * | 12/2007 | Mizuno | G09G 3/2007 382/168 |
| 2008/0203929 | A1 * | 8/2008 | Park | H05B 45/22 315/158 |

(Continued)

FOREIGN PATENT DOCUMENTS

| | | |
|---|---|---|
| KR | 10-2010-0076202 | 7/2010 |
| KR | 10-2017-0003215 | 1/2017 |

(Continued)

*Primary Examiner* — Ke Xiao
*Assistant Examiner* — Jennifer L Zubajlo
(74) *Attorney, Agent, or Firm* — F. CHAU & ASSOCIATES, LLC

(57) ABSTRACT

A display device may include a display panel including pixels, and a display panel driver. The display panel driver may receive an input image, detect a first pattern from input image data of the input image, determine a luminance weight for each color based on a luminance of the input image of the first pattern and a luminance of a reference image of a second pattern, apply, in response to detecting of the first pattern, the luminance weight to data voltages to determine compensation data voltages, and apply the compensation data voltages to the pixels.

20 Claims, 14 Drawing Sheets

(56) References Cited

U.S. PATENT DOCUMENTS

| | | | | |
|---|---|---|---|---|
| 2010/0165002 | A1* | 7/2010 | Ahn | G09G 3/3648 345/102 |
| 2011/0090265 | A1* | 4/2011 | Muroi | G09G 3/3426 345/102 |
| 2011/0273494 | A1* | 11/2011 | Jun | G09G 3/2003 345/694 |
| 2011/0310134 | A1* | 12/2011 | Nakatsuka | G09G 3/3406 345/102 |
| 2013/0088528 | A1* | 4/2013 | Borgers | G09G 3/3648 345/690 |
| 2013/0176254 | A1* | 7/2013 | Lee | G06F 3/048 345/173 |
| 2013/0322749 | A1* | 12/2013 | Ha | H04N 19/176 382/165 |
| 2014/0168385 | A1* | 6/2014 | Sudo | H04N 13/128 348/47 |
| 2014/0354698 | A1* | 12/2014 | Lee | G09G 3/3258 345/690 |
| 2017/0169750 | A1* | 6/2017 | Jung | G09G 3/3233 |
| 2017/0236490 | A1* | 8/2017 | Cheon | G09G 5/10 345/691 |
| 2021/0241680 | A1* | 8/2021 | Ock | G09G 3/32 |
| 2021/0256892 | A1* | 8/2021 | Kang | G09G 3/2003 |
| 2023/0341258 | A1* | 10/2023 | Peng | G09G 3/2074 |

FOREIGN PATENT DOCUMENTS

| | | | | | |
|---|---|---|---|---|---|
| KR | 2017003215 | A | * | 1/2017 | G09G 3/3233 |
| KR | 20170003215 | A | * | 1/2017 | G09G 3/3233 |
| KR | 10-2017-0070297 | | | 6/2017 | |
| KR | 2018092000 | A | * | 8/2018 | G02F 1/13306 |
| KR | 20180092000 | A | * | 8/2018 | G09G 3/3614 |
| KR | 10-1943419 | | | 1/2019 | |
| KR | 10-2061554 | | | 12/2019 | |

* cited by examiner

| BDS |
|---|
| 1 |

PI

| Mapping data |
|---|
| 10101010 |
| 01010101 |
| 10101010 |
| 01010101 |

| | Red | Green | Blue |
|---|---|---|---|
| Color0 | 0 | 255 | 0 |
| Color1 | 0 | 0 | 0 |

DISPLAY DEVICE

PRIORITY STATEMENT

This application claims priority under 35 U.S.C. § 119 to Korean Patent Application No. 10-2022-0072396, filed on Jun. 14, 2022 in the Korean Intellectual Property Office KIPO, the contents of which are herein incorporated by reference in their entireties.

BACKGROUND

1. Field

Embodiments of the present inventive concept relate to a display device. More particularly, embodiments of the present inventive concept relate to a display device compensating for a luminance according to a pattern.

2. Description of the Related Art

Generally, a display device may include a display panel, a timing controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The timing controller may control the gate driver and the data driver.

The display device may perform correction on a luminance and a color (hereinafter, referred to as "gamma correction"). When gamma correction is performed, luminous efficiency of the display panel may be different according to a grayscale value, a temperature, etc., and thus a color coordinate shift may occur. Also, the color coordinate shift may occur by a pattern of an displayed image. Finally, a display quality of the display panel may be deteriorated by the color coordinate shift.

SUMMARY

Embodiments of the present inventive concept provide a display device compensating for a luminance for each color according to a pattern.

According to embodiments of the present inventive concept, a display device may include a display panel including pixels, and a display panel driver. The display panel driver may receive an input image, detect a first pattern from input image data of the input image, determine a luminance weight for each color based on a luminance of the input image of the first pattern and a luminance of a reference image of a second pattern, apply, in response to detecting of the first pattern, the luminance weight to data voltages to determine compensation data voltages, and apply the compensation data voltages to the pixels.

In an embodiment, the first pattern may be a sub-checker pattern.

In an embodiment, the first pattern of the input image may have a size of N×M. N and M are positive integers greater than or equal to 2 and correspond to a number of pixel rows and a number of pixel columns in the input image, respectively.

In an embodiment, the second pattern of the reference image may be a full white pattern.

In an embodiment, the luminance weight may be calculated using an equation LW=(L2/2)/L1, where LW is the luminance weight, L1 is the luminance of the input image of the first pattern, and L2 is the luminance of the reference image of the second pattern.

According to embodiments of the present inventive concept, a display device may include a display panel including a plurality of pixels, and a display panel driver. The display panel driver may receive an input image, detect a first pattern from input image data of the input image, determine a luminance weight for each color based on a luminance of the input image and a luminance of a reference image having a second pattern, determine a grayscale weight for each color based on a color ratio of a current grayscale value of the input image and a color ratio of a reference grayscale value of the reference image, apply the grayscale weight to data voltages to determine a first compensation data voltages, apply, in response to detecting of the first pattern, the luminance weight to the first compensation data voltages to determine second compensation data voltages, and apply the second compensation data voltages to the pixels.

In an embodiment, the first pattern may be a sub-checker pattern.

In an embodiment, the first pattern of the input image may have a size of N×M. N and M may be positive integers greater than or equal to 2 and correspond to a number of pixel rows and a number of pixel columns in the input image, respectively.

In an embodiment, the second pattern may be a full white pattern.

In an embodiment, the luminance weight may be calculated using an equation LW=(L2/2)/L1, where LW is the luminance weight, L1 is the luminance of the input image of the first pattern, and L2 is the luminance of the reference image of the second pattern.

In an embodiment, the reference grayscale value may be a maximum grayscale value.

In an embodiment, the grayscale weight may be calculated using an equation GW=R1/R2, where GW is the grayscale weight, R1 is the color ratio of the current grayscale value of the input image, and R2 is the color ratio of the reference grayscale value of the reference image.

In an embodiment, the display device may further include a temperature sensor to measure a current temperature of the display device. The display panel driver may determine a temperature weight for each color based on a luminance at a room temperature and a luminance at the current temperature, and apply the temperature weight and the grayscale weight to the data voltages to determine the first compensation data voltages.

In an embodiment, the temperature weight may be calculated using an equation TW=L3/L4, where TW is the temperature weight, L3 is the luminance at the room temperature, and L4 is the luminance at the current temperature.

According to embodiments of the present inventive concept, a display device includes a display panel including pixels, and a display panel driver. The display panel driver may receive an input image, detect a first pattern from input image data of the input image, determine a luminance weight for each color based on a luminance of the input image of the first pattern and a luminance of a reference image of a second pattern, determine a temperature weight for each color based on a luminance at a room temperature and a luminance at a current temperature, apply the temperature weight to data voltages to determine a first compensation data voltages, apply, in response to detecting of the first pattern, the luminance weight to the first compensation data voltages to determine second compensation data voltages, and apply the second compensation data voltages to the pixels.

In an embodiment, the first pattern may be a sub-checker pattern.

In an embodiment, the first pattern of the input image may have a size of N×M, where N and M are positive integers greater than or equal to 2 and correspond to a number of pixel rows and a number of pixel columns in the input image, respectively.

In an embodiment, the second pattern may be a full white pattern.

In an embodiment, the luminance weight may be calculated using an equation LW=(L2/2)/L1, where LW is the luminance weight, L1 is the luminance of the first pattern, and L2 is the luminance of the second pattern.

In an embodiment, the temperature weight may be calculated using an equation TW=L3/L4, where TW is the temperature weight, L3 is the luminance at the room temperature, and L4 is the luminance at the current temperature.

Therefore, the display device may compensate for a luminance for each color according to a pattern by detecting a first pattern based on input image data, determining a luminance weight for each color based on a luminance of the first pattern and a luminance of a second pattern, applying the luminance weight to data voltages to determine compensation data voltages when the first pattern is detected, and applying the compensation data voltages to the pixels. Accordingly, a color coordinate shift occurring in the first pattern may be prevented.

In addition, the display device may compensate for a luminance for each color according to a grayscale value by detecting a first pattern based on input image data, determining a luminance weight for each color based on a luminance of the first pattern and a luminance of a second pattern, determining a grayscale weight for each color based on a color ratio of a current grayscale value and a color ratio of a reference grayscale value, applying the grayscale weight to data voltages to determine a first compensation data voltages, applying the luminance weight to the first compensation data voltages to determine second compensation data voltages when the first pattern is detected, and applying the second compensation data voltages to the pixels. Accordingly, a color coordinate shift caused by different luminous efficiency for each grayscale value may be prevented.

Further, the display device may compensate for a luminance for each color according to a temperature by detecting a first pattern based on input image data, determining a luminance weight for each color based on a luminance of the first pattern and a luminance of a second pattern, to determine a temperature weight for each color based on a luminance at a room temperature and a luminance at a current temperature, applying the temperature weight to data voltages to determine a first compensation data voltages, applying the luminance weight to the first compensation data voltages to determine second compensation data voltages when the first pattern is detected, and applying the second compensation data voltages to the pixels.

However, the effects of the present inventive concept are not limited to the above-described effects, and may be variously expanded without departing from the spirit and scope of the present inventive concept.

DETAILED DESCRIPTION OF THE INVENTIVE CONCEPT

Hereinafter, the present inventive concept will be explained in detail with reference to the accompanying drawings.

Figure 1:
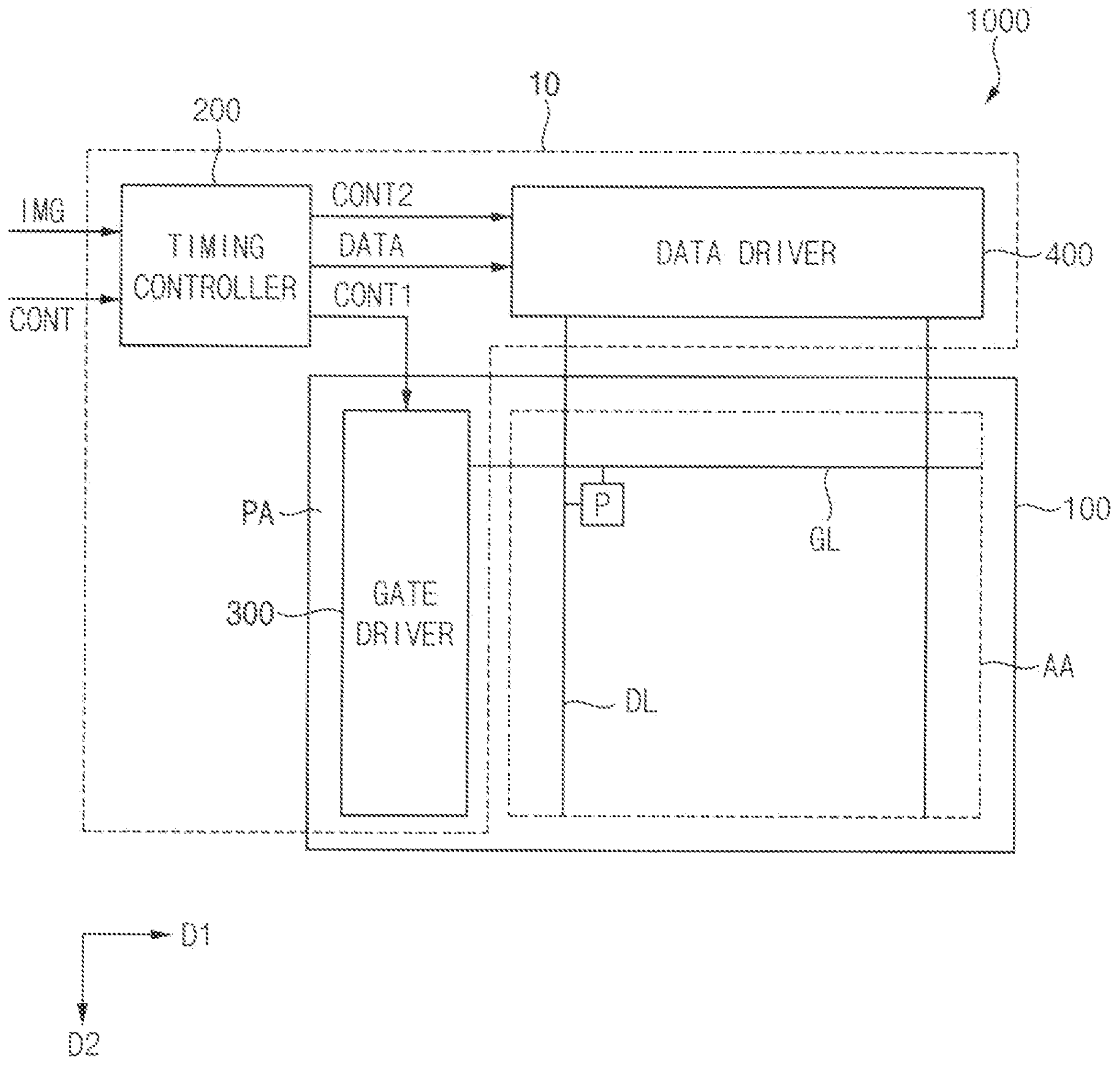
FIG. 1 is a block diagram illustrating a display device according to embodiments of the present inventive concept.

FIG. 1 is a block diagram illustrating a display device 1000 according to embodiments of the present inventive concept.

Referring to FIG. 1, the display device 1000 may include a display panel 100 and a display panel driver 10. The display panel driver 10 may include a timing controller 200, a gate driver 300, and a data driver 400. In an embodiment, the timing controller 200 and the data driver 400 may be integrated into one chip.

The display panel 100 has a display region AA on which an image is displayed and a peripheral region PA adjacent to the display region AA. In an embodiment, the gate driver 300 may be mounted on the peripheral region PA of the display panel 100.

The display panel 100 may include a plurality of gate lines GL, a plurality of data lines DL, a plurality of sensing lines SL, and a plurality of pixels P electrically connected to the data lines DL, the gate lines GL, and the sensing lines SL. The gate lines GL may extend in a first direction D1 and the data lines DL and the sensing lines SL may extend in a second direction D2 crossing the first direction D1.

The timing controller 200 may receive input image data of an input image IMG and an input control signal CONT from a host processor (e.g., a graphic processing unit; GPU). For example, the input image data of the input image IMG may include red image data, green image data and blue image data. In an embodiment, the input image data of the input image IMG may further include white image data. In an embodiment, the input image data of the input image IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, and data signal DATA based on the input image data of the input image IMG and the input control signal CONT.

The timing controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The timing controller 200 may receive the input image data of the input image IMG and the input control signal CONT, and generate the data signal DATA. The timing controller 200 may output the data signal DATA to the data driver 400.

The gate driver 300 may generate gate signals for driving the gate lines GL in response to the first control signal CONT1 input from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may convert the data signal DATA into data voltages (or, compensation data voltages) of an analog signal. The data driver 400 may output the data voltages (or, the compensation data voltages) to the data lines DL.

The data driver 400 may generate sensing data SD by sensing the pixels P (e.g., sensing a threshold voltage and a mobility characteristic of a driving transistor of each of the pixels P). The data driver 400 may output the sensing data SD to the timing controller 200. The timing controller 200 may compensate for the input image data of the input image IMG based on the sensing data SD.

Figure 2:
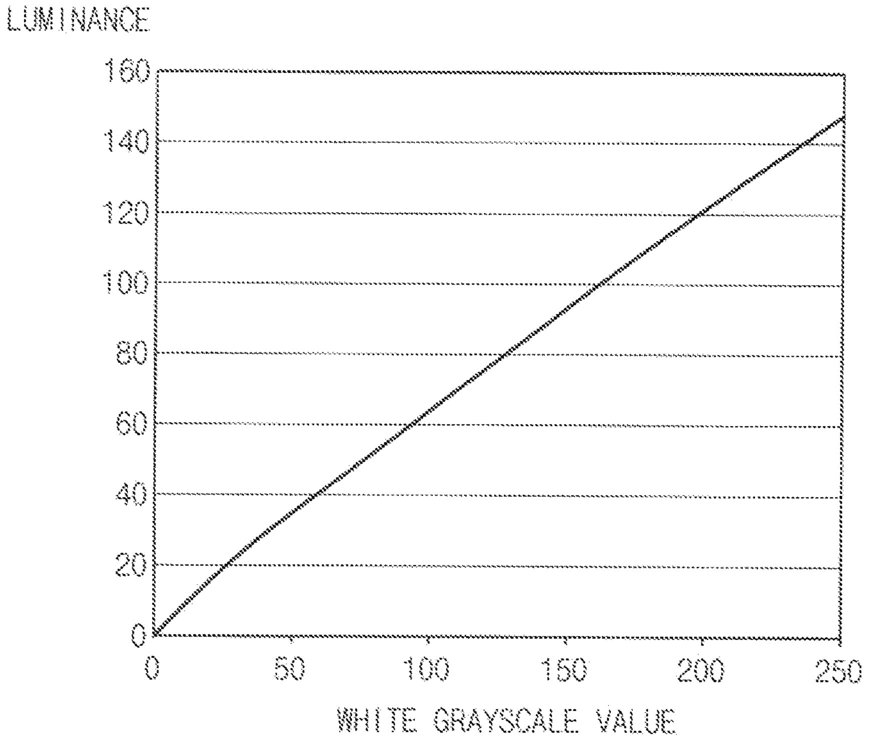
FIG. 2 is a graph illustrating an example of a luminance according to a white grayscale value, before gamma correction is applied, of the display device of FIG. 1.
Figure 3:
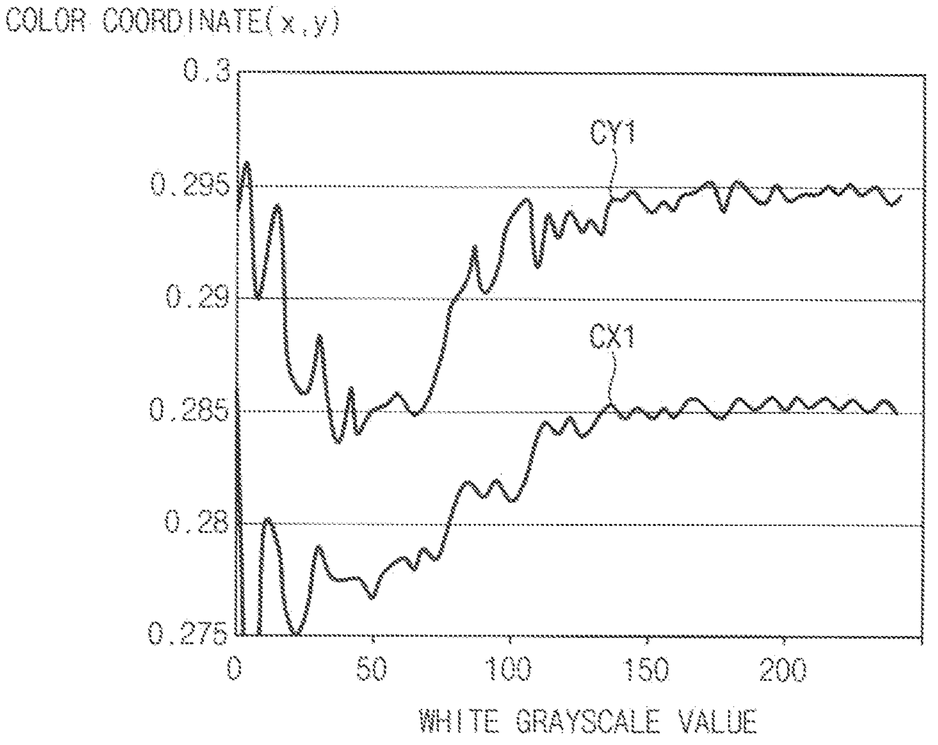
FIG. 3 is a graph illustrating an example of a color coordinate according to a white grayscale value, before gamma correction is applied, of the display device of FIG. 1.
Figure 4:
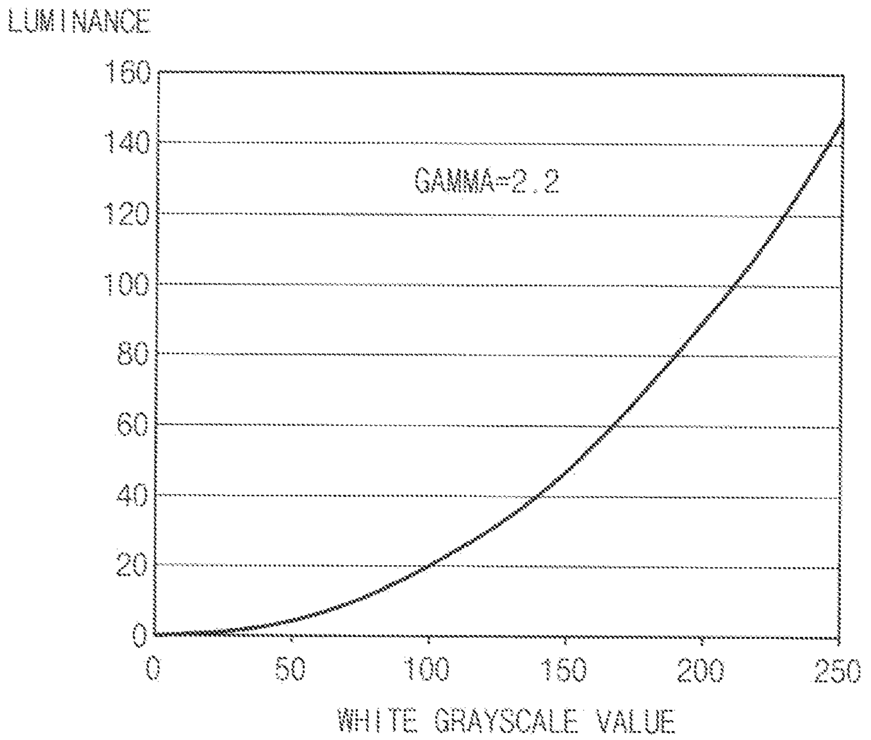
FIG. 4 is a graph illustrating an example of an ideal luminance according to a white grayscale value, after gamma correction is applied, of the display device of FIG. 1.
Figure 5:
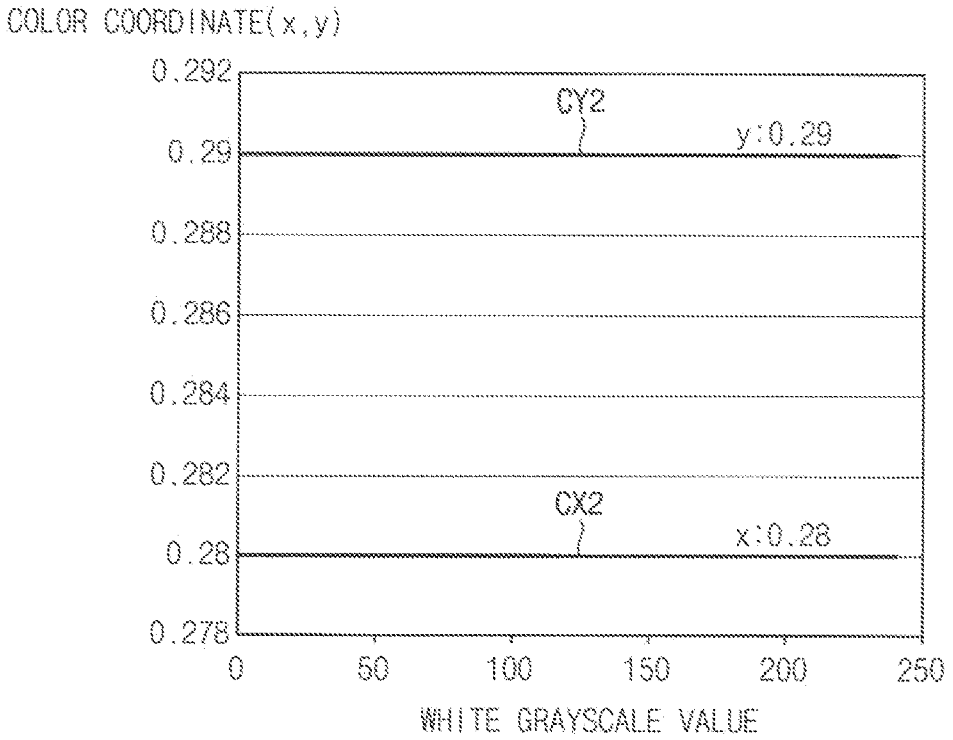
FIG. 5 is a graph illustrating an example of an ideal color coordinate according to a white grayscale value, after gamma correction is applied, of the display device of FIG. 1.

FIG. 2 is a graph illustrating an example of a luminance according to a white grayscale value, before gamma correction is applied, of the display device 1000 of FIG. 1, FIG. 3 is a graph illustrating an example of a color coordinate according to a white grayscale value, before gamma correction is applied, of the display device 1000 of FIG. 1, FIG. 4 is a graph illustrating an example of an ideal luminance according to a white grayscale value, after gamma correction is applied, of the display device 1000 of FIG. 1, and FIG. 5 is a graph illustrating an example of an ideal color coordinate according to a white grayscale value, after gamma correction is applied, of the display device 1000 of FIG. 1. FIGS. 2 to 5, it is exemplified that the number of the grayscale value of the input image data of the input image IMG is 256 ranging from a grayscale value of 0 to a grayscale value of 255, and the gamma correction is performed based on the white grayscale value.

The white grayscale value may be a grayscale value for displaying white. That is, the white grayscale value may be a grayscale value when grayscale values of all colors are the same as each other. In an embodiment, in the event that a pixel has three sub-pixels of red, green, and blue, and such three sub-pixels have the same grayscale value, the pixel has a white grayscale value of a specific value. For example, when the display device 1000 displays a white grayscale value of 255, a red grayscale value of the red sub-pixel, a green grayscale value of the green sub-pixel, and a blue grayscale value of the blue sub-pixel may have a grayscale value of 255.

As shown in FIG. 2, the luminance according to the white grayscale value, before the gamma correction is applied, shows a generally linear graph. That is, in FIG. 2, as the white grayscale value increases, the luminance may increase substantially linearly.

When the gamma correction is performed by setting a target gamma value to 2.2, the luminance according to the white grayscale value is a non-linear graph as shown in FIG. 4. That is, in FIG. 4, the luminance may increase nonlinearly as the white grayscale value increases.

As shown in FIG. 3, the color coordinate according to the white grayscale value do not have a constant value before the gamma correction is applied. In FIG. 3, CX1 represents an x color coordinate, and CY1 represents a y color coordinate.

When the gamma correction is performed by setting a target color coordinate (x, y) to (0.28, 0.29), the color coordinate according to the white grayscale value may have a constant value as shown in FIG. 5. In FIG. 5, CX2 represents an x color coordinate, CY2 represents a y color coordinate, CX2 has 0.28, and CY2 has 0.29.

However, FIG. 5 exemplifies a case in which the gamma correction is ideally performed, and in an actual display panel, the color coordinate corrected by the gamma correction may not be uniform in an entire white grayscale region. The case in which the color coordinate corrected by the gamma correction is not uniform in the entire white grayscale region will be described later with reference to FIGS. 6 to 8.

Figure 6:
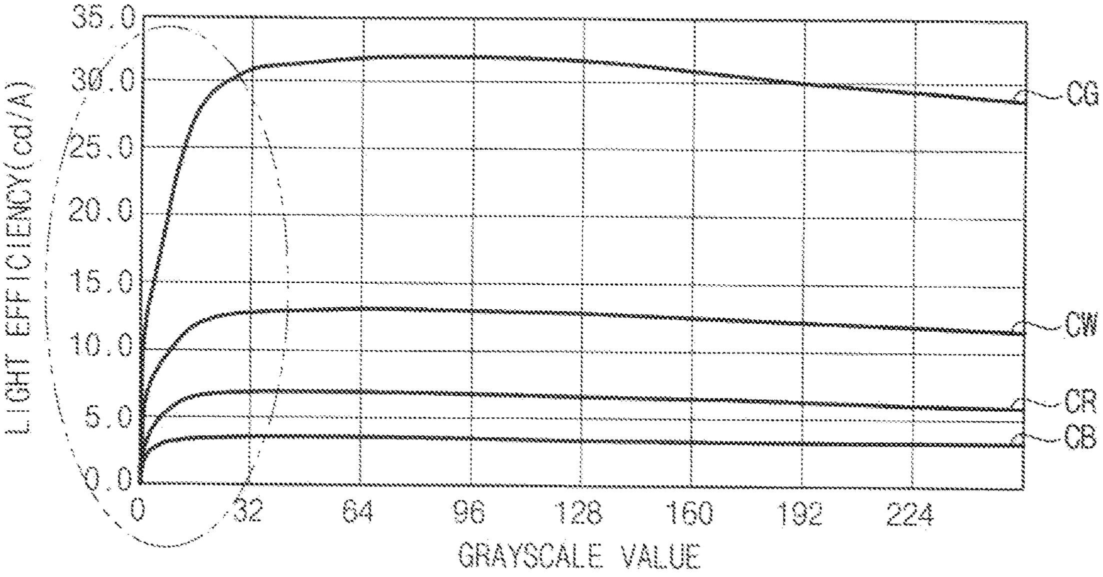
FIG. 6 is a graph illustrating luminous efficiency of red, green, blue, and white according to a grayscale value of the display panel of FIG. 1.
Figure 7:
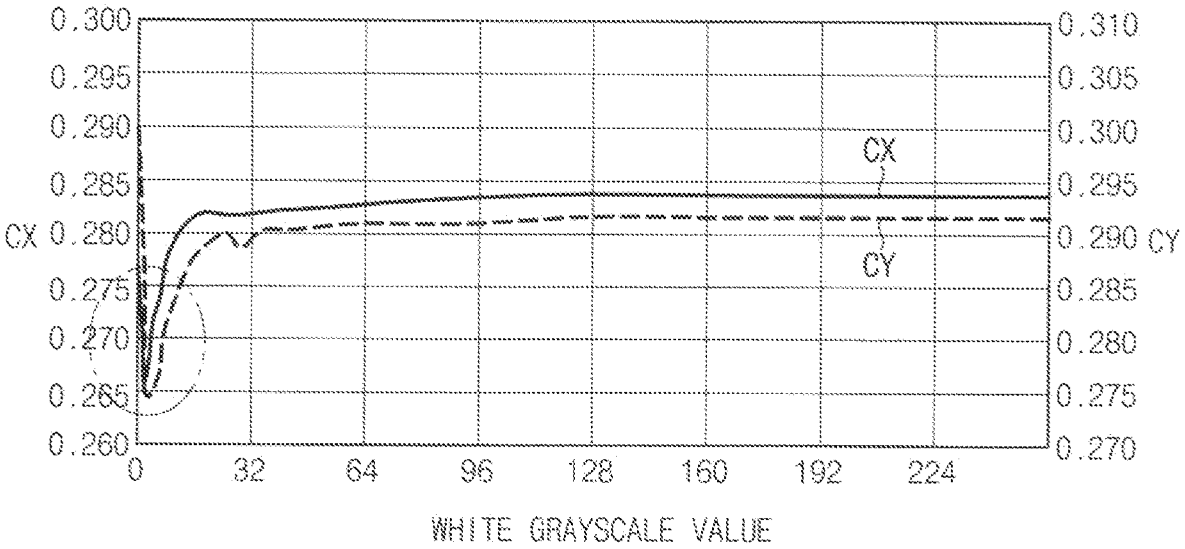
FIG. 7 is a graph illustrating an example of an actual color coordinate according to a white grayscale value, after gamma correction is applied, of the display device of FIG. 1.
Figure 8:
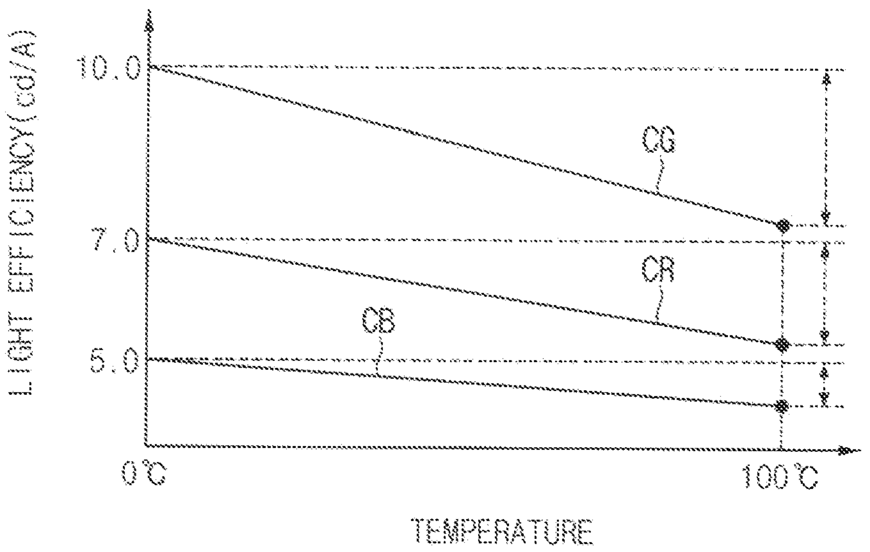
FIG. 8 is a graph illustrating luminous efficiency according to a temperature of a display panel.
Figure 9:
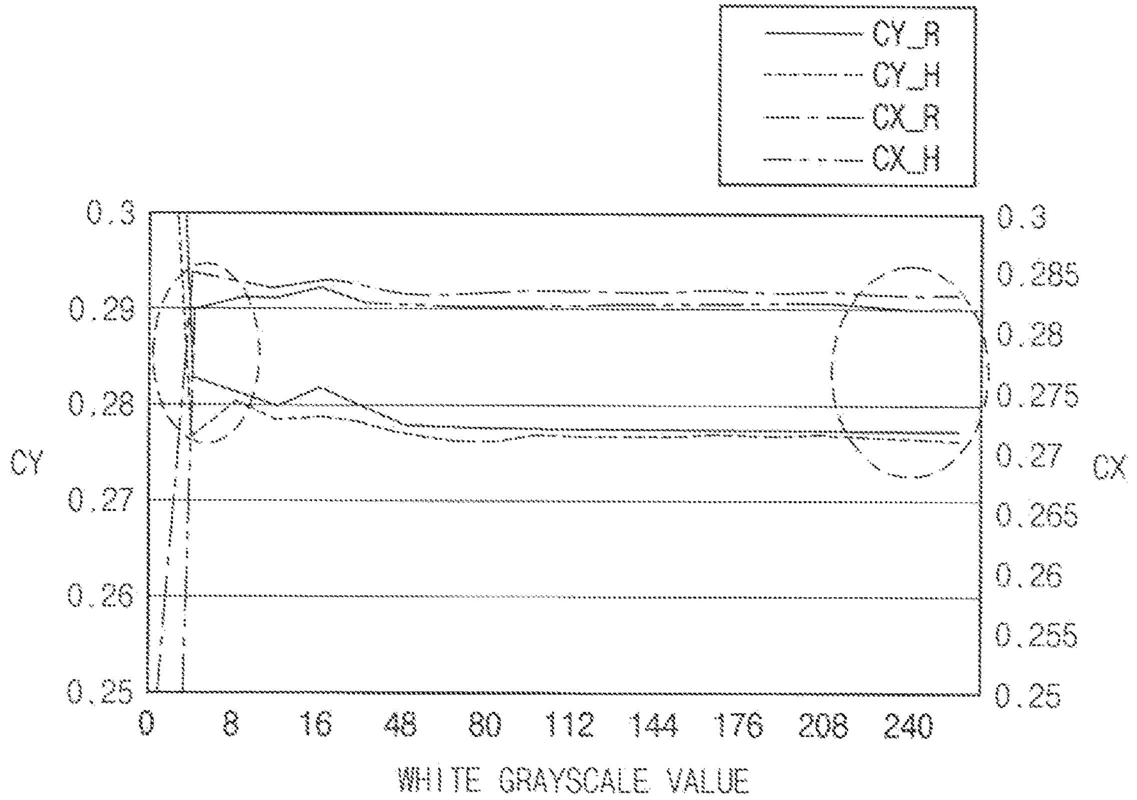
FIG. 9 is a graph illustrating an example of an actual color coordinate according to a temperature, after gamma correction is applied, of the display device of FIG. 1.

FIG. 6 is a graph illustrating luminous efficiency of red, green, blue, and white according to the white grayscale value of the display panel 100 of FIG. 1, FIG. 7 is a graph illustrating an example of an actual color coordinate according to the white grayscale value, after the gamma correction is applied, of the display device 1000 of FIG. 1, FIG. 8 is a graph illustrating the luminous efficiency according to a temperature of the display panel 100, and FIG. 9 is a graph illustrating an example of the actual color coordinate according to the temperature, after the gamma correction is applied, of the display device 1000 of FIG. 1. In FIGS. 7 and 9, CX represents an x color coordinate, and CY represents a y color coordinate. In an embodiment, the temperature of the display panel 100 may be an ambient temperature around the display panel 100 or may be temperature measured at a component of the display panel 100.

Referring to FIGS. 6 and 7, a red luminous efficiency of the display panel 100 according to the grayscale value is represented by CR, a green luminous efficiency of the display panel 100 according to the grayscale value is represented by CG, and a blue luminous efficiency of the display panel 100 according to the grayscale value is represented by CB, and a white luminous efficiency of the display panel 100 according to the grayscale value is represented by CW. In FIG. 6, the luminous efficiency represents luminous intensity according to a driving current, and a unit of the luminous efficiency may be candela/ampere (cd/A).

As shown in FIG. 6, the red luminous efficiency CR, the green luminous efficiency CG, the blue luminous efficiency CB, and the white luminous efficiency CW may be relatively uniform in a grayscale value of 32 or more. On the other hand, in a low grayscale region smaller than a grayscale value of 32, the red luminous efficiency CR, the green luminous efficiency CG, the blue luminous efficiency CB, and the white luminous efficiency CW may not be uniform.

In a grayscale value of 32 or more, the green luminous efficiency CG may have a greater value than the red luminous efficiency CR and the blue luminous efficiency CB by a substantially constant ratio.

On the other hand, in the low grayscale region smaller than a grayscale value of 32, a degree to which the green luminous efficiency CG is greater than the red luminous efficiency CR and the blue luminous efficiency CB may not be uniform. In addition, in the low grayscale region smaller than a grayscale value of 32, a degree to which the green luminous efficiency CG is greater than the red luminous efficiency CR and the blue luminous efficiency CB may be smaller than the degree in the high grayscale region greater than a grayscale value of 32.

For this reason, after the gamma correction is performed, the x color coordinate CX and the y color coordinate CY may have uniform values in the high grayscale region of a grayscale value of 32 or more, whereas the x color coordinate CX and the y color coordinate CY may not have uniform values in the low grayscale region smaller than a grayscale value of 32.

As described above, since the luminous efficiency of the display panel 100 is different for each grayscale value, a color coordinate shift may occur at a low grayscale value. When the color coordinate shift occurs in the low grayscale value, the color coordinate of the high grayscale value and the color coordinate of the low grayscale value may be different, and thus a display quality of the display panel 100 may deteriorate.

Referring to FIGS. 8 and 9, the x color coordinate of the display panel 100 at a room temperature (e.g., 25° C.) is represented by CX_R, the y color coordinate of the display panel 100 at the room temperature is represented by CY_R, the x color coordinate of the display panel 100 at a high temperature (e.g., 100° C.) is represented by CX_H, and the y color coordinate of the display panel 100 at the high temperature is represented by CY_H. In FIG. 8, the luminous efficiency represents the luminous intensity according to the driving current, and the unit of the luminous efficiency may be candela/ampere (cd/A).

As shown in FIG. 8, the red luminous efficiency CR, the green luminous efficiency CG, and the blue luminous efficiency CB may not be uniform according to the temperature of the display panel 100. As the temperature of the display panel 100 increases, the red luminous efficiency CR, the green luminous efficiency CG, and the blue luminous efficiency CB may decrease. For this reason, after the gamma correction is performed, the x color coordinate CX and the y color coordinate CY may not have uniform values according to the temperature.

As such, since the luminous efficiency of the display panel 100 is different for each temperature, the color coordinate shift may occur. When the color coordinate shift occurs, the color coordinate at the high temperature and the color coordinate at the room temperature may be different, and thus the display quality of the display panel 100 may deteriorate.

Figure 10:
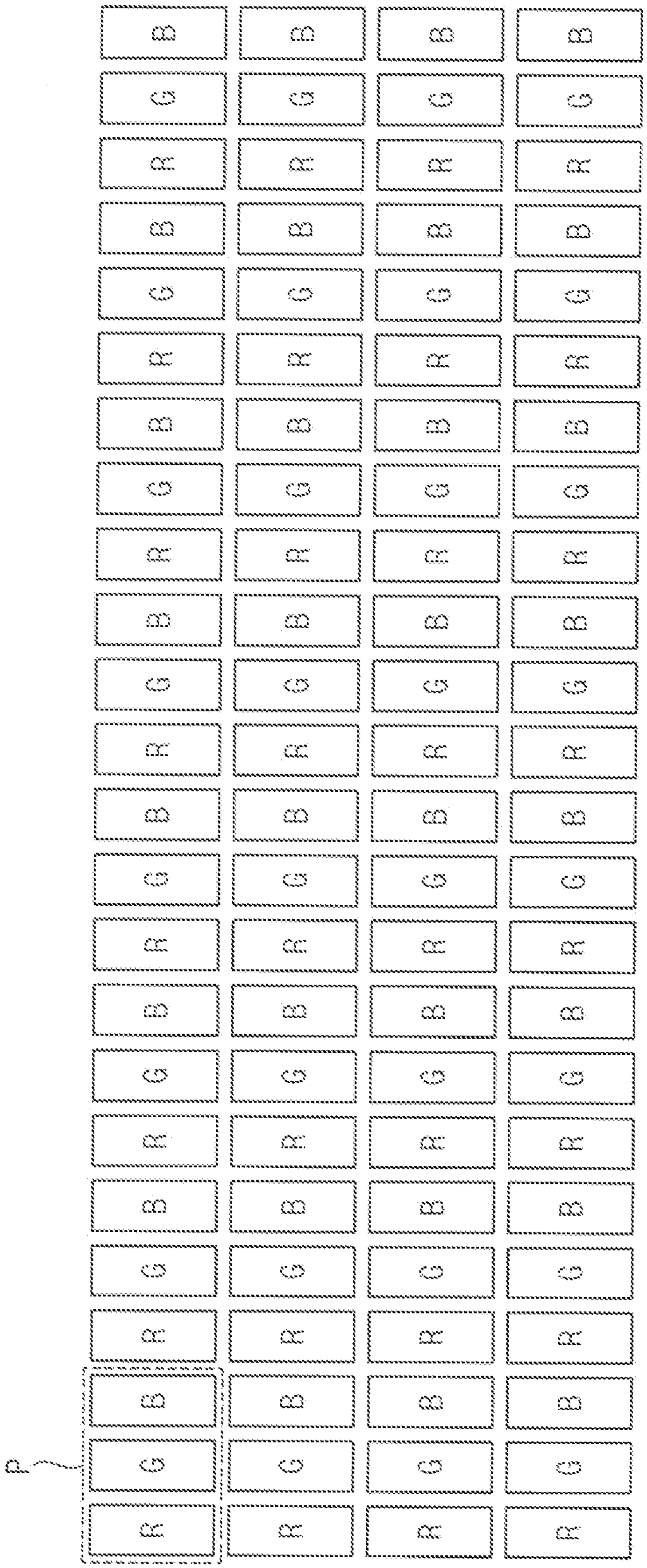
FIG. 10 is a diagram illustrating an example of a part of a display panel of the display device of FIG. 1.
Figure 11:
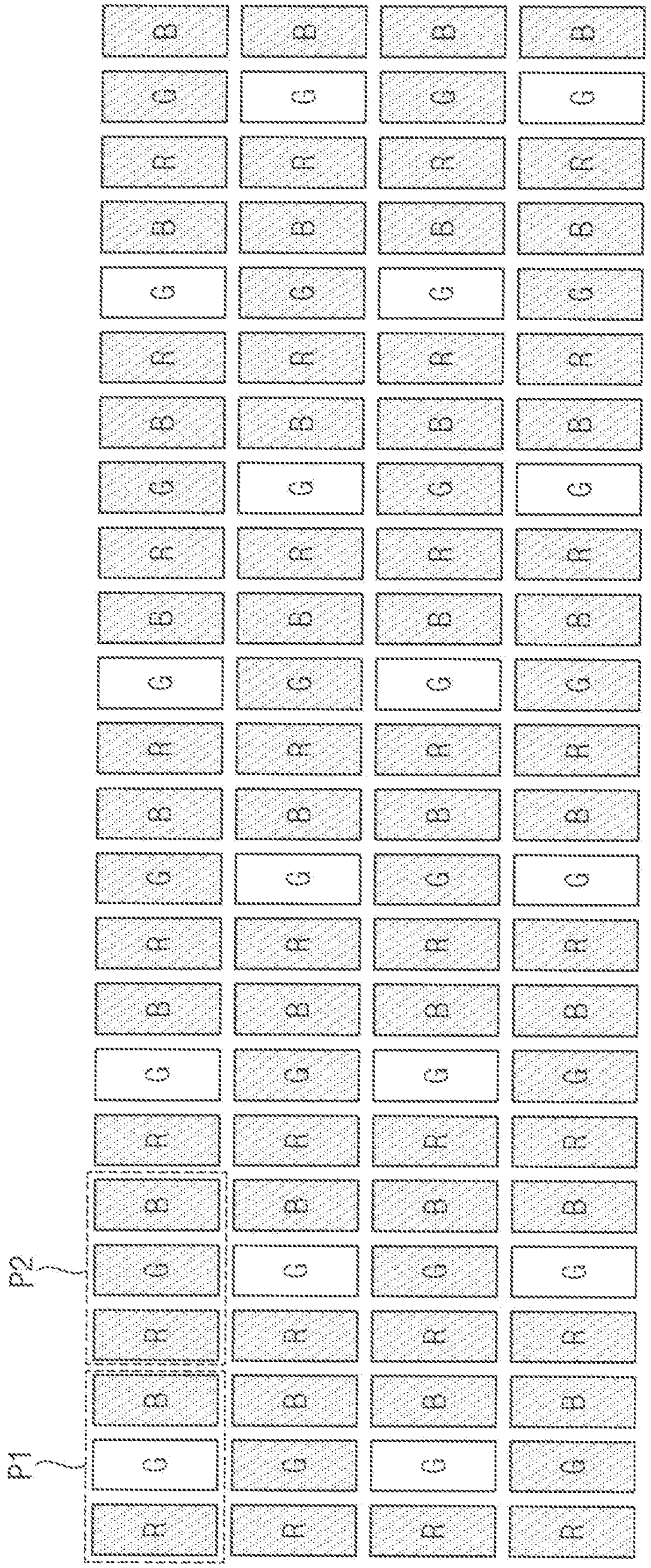
FIG. 11 is a diagram illustrating an example of a sub-checker pattern.
Figure 12A:
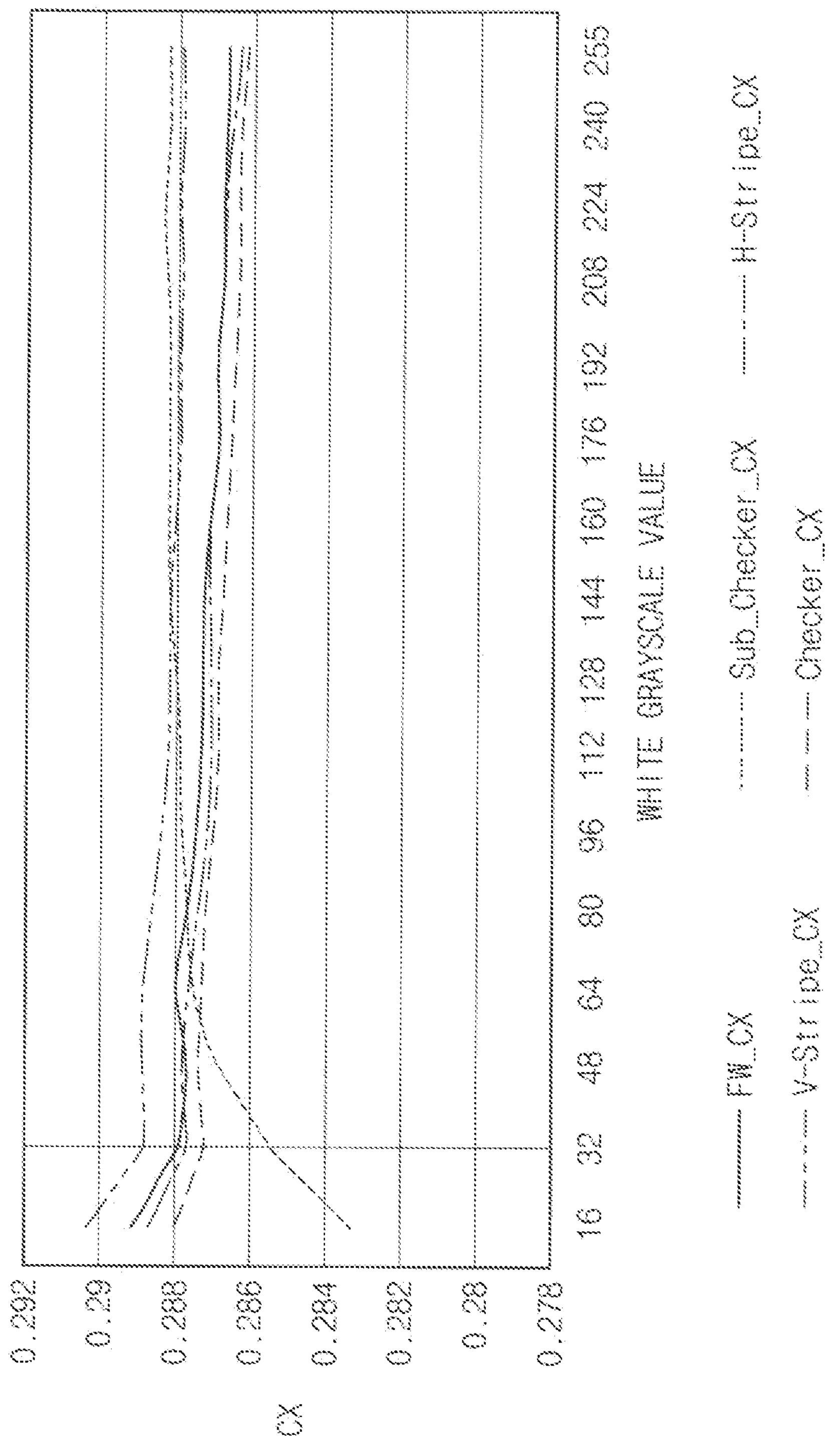
FIGS. 12A and 12B are diagrams illustrating a color coordinate according to a pattern.
Figure 12B:
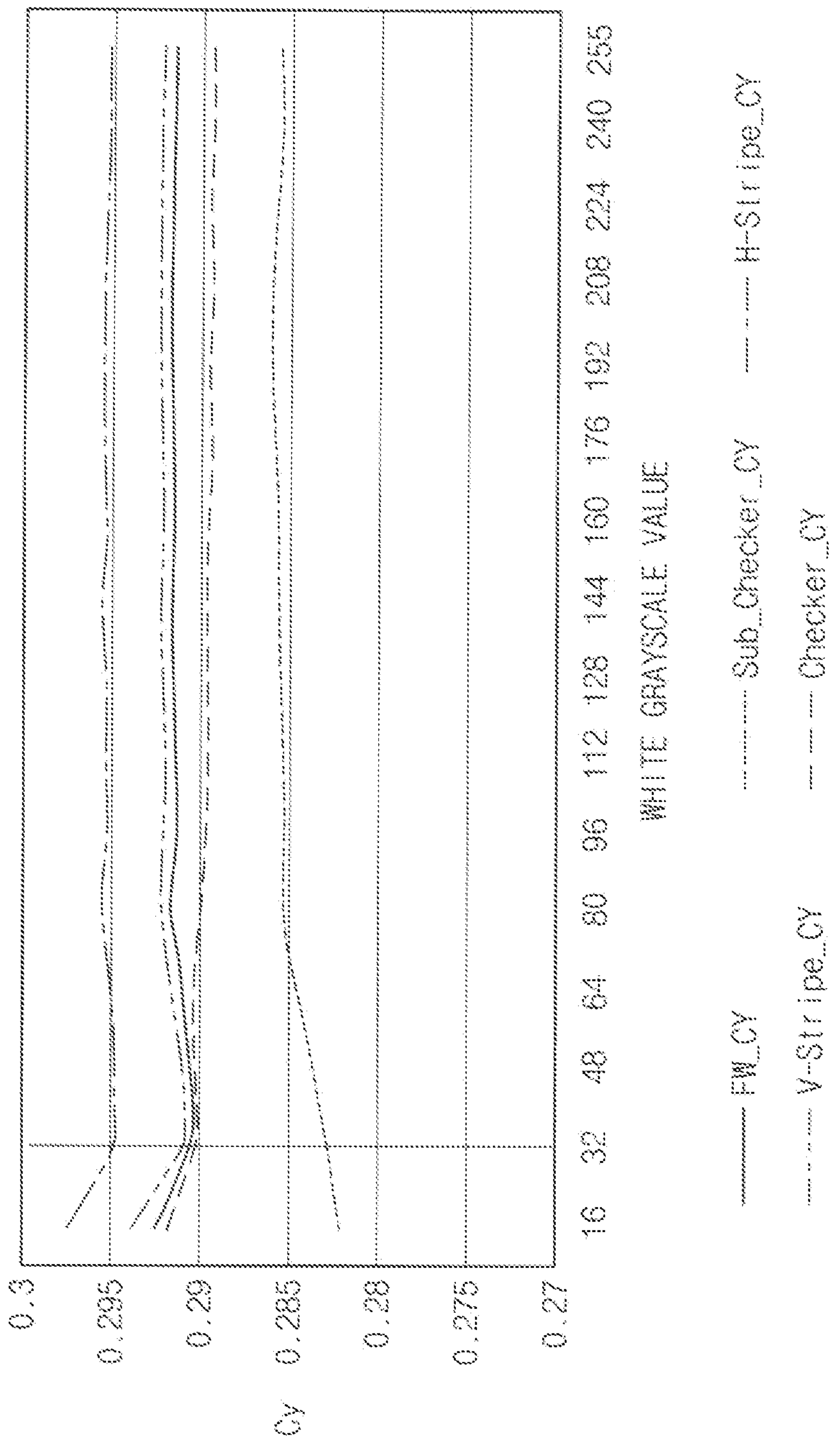

FIG. 10 is a diagram illustrating an example of a part of the display panel 100 of the display device 1000 of FIG. 1, FIG. 11 is a diagram illustrating an example of a sub-checker pattern, and FIGS. 12A and 12B are diagrams illustrating the color coordinate according to a pattern. In FIGS. 12A and 12B, CX represents an x color coordinate, and CY represents a y color coordinate.

Referring to FIGS. 12A and 12B, the x color coordinate of the display panel 100 in a full white pattern is represented by a reference FW_CX, the y color coordinate of the display panel 100 in the full white pattern is represented by a reference FW_CY, the x color coordinate of the display panel 100 in the sub-checker pattern is represented by a reference Sub-Checker_CX, the y color coordinate of the display panel 100 in the sub-checker pattern is represented by a reference Sub-Checker_CY, the x color coordinate of the display panel 100 in a horizontal pattern is represented by a reference H-stripe_CX, the y color coordinate of the display panel 100 in the horizontal pattern is represented by H-stripe_CY, the x color coordinate of the display panel 100 in a vertical pattern is represented by a reference V-stripe_CX, the y color coordinate of the display panel 100 in the vertical pattern is represented by a reference V-stripe_CY, the x color coordinate of the display panel 100 in a checker pattern is represented by a reference Checker_CX, and the y color coordinate of the display panel 100 in the checker pattern is represented by Checker_CY.

For example, the horizontal pattern may be a pattern including stripes in the first direction D1 in FIG. 1, and the vertical stripe pattern may be a pattern including stripes in the second direction D2 in FIG. 1.

Referring to FIGS. 10 and 11, each of the pixels P may include a red sub-pixel R, a green sub-pixel G, and a blue sub-pixel B. For example, the red sub-pixel R may display a red grayscale value, the green sub-pixel G may display a green grayscale value, and the blue sub-pixel B may display a blue grayscale value.

For example, as shown in FIG. 11, in the sub-checker pattern, a pixel P (e.g., P1) in which the sub-pixels R, G, and B display a grayscale value of 0 and a pixel P (e.g., P2) in which any one of the sub-pixels R, G, and B (e.g., in FIG. 11, the green sub-pixel G) displays a grayscale value other than 0 may be alternately arranged.

For example, in the checker pattern, a pixel P in which the sub-pixels R, G, and B display a grayscale value of 0 and a pixel Pin which all of the sub-pixels R, G, and B display the same grayscale value other than the grayscale value of 0 may be alternately arranged.

That is, in the checker pattern, all of the sub-pixels R, G, and B of the pixel P displaying a grayscale value other than the grayscale value of 0 may display the grayscale value other than the grayscale value of 0. In the sub-checker pattern, any one of the sub-pixels R, G, and B of the pixel P (e.g., P2) displaying a grayscale value other than the grayscale value of 0 may display the grayscale value other than the grayscale value of 0.

For example, the full white pattern may be a pattern in which the sub-pixels R, G, and B of all the pixels P display the same grayscale value.

In FIGS. 12A and 12B, the x color coordinate CX and the y color coordinate CY may be relatively uniform in the patterns except for the sub-checker pattern. On the other hand, in the sub-checker pattern, the x color coordinate CX and the y color coordinate CY may not be uniform (especially in the low grayscale value).

For this reason, after the gamma correction is performed, the x color coordinate CX and y color coordinate CY may have uniform values in the patterns except for the sub-checker pattern, whereas in the sub-checker pattern, the x color coordinate CX and the y color coordinate CY may not have a uniform value.

As such, in the sub-checker pattern, the x color coordinate CX and the y color coordinate CY may be different for each grayscale value, and thus a color coordinate shift may occur at the low grayscale value. When the color coordinate shift occurs in the low gray scale value, the color coordinate of the high grayscale value and the color coordinate of the low grayscale value may be different, and thus the display quality of the display panel 100 may deteriorate.

Figures 13, 14:
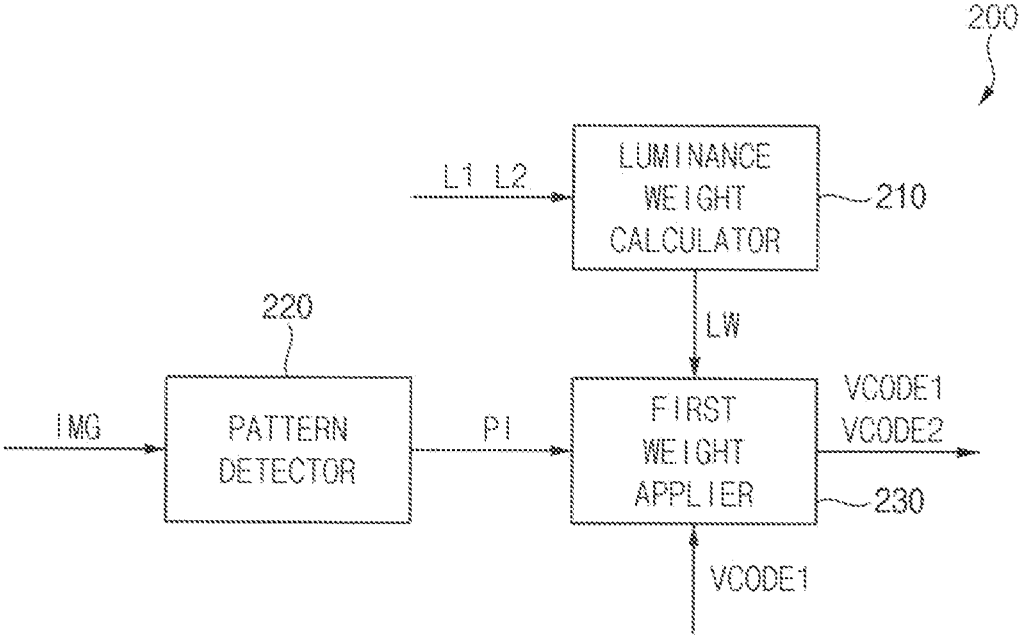
FIG. 13 is a block diagram illustrating an example of a timing controller of the display device of FIG. 1.
FIG. 14 is a table illustrating an example in which the display device of FIG. 1 detects a first pattern.

FIG. 13 is a block diagram illustrating an example of the timing controller 200 of the display device 1000 of FIG. 1, FIG. 14 is a table illustrating an example in which the display device 1000 of FIG. 1 detects a first pattern. In FIG. 13, a first voltage code VCODE1 is a voltage code corresponding to the data voltages, and a second voltage code VCODE2 is a voltage code corresponding to the compensation data voltages.

Referring to FIGS. 1 and 13, the timing controller 200 may receive an input image IMG, detect a first pattern based on input image data of the input image IMG, determine a luminance weight LW for each color (e.g., red, green, and blue) based on a luminance L1 of the first pattern (i.e., a luminance L1 of the input image IMG having the first pattern) and a luminance L2 of a second pattern (i.e., a luminance L2 of a reference image having the second pattern), and apply the luminance weight LW to the data voltages to determine the compensation data voltages when the first pattern is detected. The data driver 400 may apply the compensation data voltages to the pixels.

The timing controller 200 may include a luminance weight calculator 210, a pattern detector 220, and a first weight applier 230 (i.e., a first weight multiplier).

The luminance weight calculator 210 may determine the luminance weight LW based on the luminance L1 of the first pattern and the luminance L2 of the second pattern.

The luminance L1 of the first pattern and the luminance L2 of the second pattern may be measured in advance, and the display device 1000 may store the measured values. The luminance weight calculator 210 may calculate the luminance weight LW based on the stored luminance L1 of the first pattern and the stored luminance L2 of the second pattern.

In an embodiment, the luminance weight LW may be calculated using an Equation 1, $$LW=(L2/2)/L1, \qquad \text{[Equation 1]}$$

where LW is the luminance weight, L1 is the luminance of the first pattern, and L2 is the luminance of the second pattern. For example, when the luminance L1 of the first pattern for a green grayscale value of 128 is 20 and the luminance L2 of the second pattern for a green grayscale value of 128 is 44, the luminance weight LW for a green grayscale value of 128 may be about 1.1. The luminance weight LW may be different for each color.

For example, the first pattern may be the sub-checker pattern. The second pattern may be the full white pattern. That is, the display device 1000 may compensate for the sub-checker pattern for each color based on the full white pattern by applying the luminance weight LW.

Referring to FIGS. 13 and 14, the pattern detector 220 may detect a certain pattern from the input image data of the input image IMG and output information PI on pixel values of the detected pattern. For example, the pattern detector 220 may detect the first pattern.

In an embodiment, the pattern detector 220 may detect the first pattern having a size of N×M, where N and M are positive integers greater than or equal to 2. The N×M size may be the size containing the pixels P of the N×M. For example, the part of the display panel 100 of FIG. 10 shows an 8×4 size. For example, N and M may be positive integers greater than or equal to 2, and may correspond to a number of pixel rows and a number of pixel columns in the input image IMG, respectively.

The pattern detector 220 may detect a pattern with only one or two pixel values in a pixel unit of N×M size. For example, the pattern detector 220 may detect whether each pixel in the pixel unit of N×M size has the same pixel value (i.e., the same grayscale value) or one of two pixel values (i.e., one of the two grayscale values). In an embodiment, the pixel unit of N×M size may correspond to the entire frame of a display panel or a predetermined portion of the frame. The pattern detector 220 may generate a binary detection signal BDS of 1 when the pattern is detected. When the binary detection signal BDS is generated, the pattern detector 220 may output the information PI on the pixel values of the detected pattern to the first weight applier 230. The pixel value of each of the pixels P may be a grayscale value of each of the sub-pixels (R, G, and B in FIG. 10) of each of the pixels P.

For example, when only two types of the pixel values exist, the pattern detector 220 may classify the two types of the pixel values into a first color Color0 and a second color Color1. In addition, the pattern detector 220 may generate mapping data by mapping a first (e.g., upper left) color to 0 and mapping the remaining color to 1. The information PI on the pixel values may include the mapping data, information on the first color Color0, and information on the second color Color1. The information on the first color Color0 may include a red grayscale value, a green grayscale value, and a blue grayscale value for displaying the first color Color0. The information on the second color Color1 may include a red grayscale value, a green grayscale value, and a blue grayscale value for displaying the second color Color1.

For example, as shown in FIGS. 11 and 14, it is assumed that the first pattern is the sub-checker pattern, N is 8, M is 4, the input image data of the input image IMG includes a pattern of FIG. 11, and a green grayscale value in FIG. 11 is 255. Since the pattern of FIG. 11 is 8×4 size and has two types of the pixel values (i.e., two grayscale values), the pattern detector 220 may output the binary detection signal BDS of 1. In addition, the pattern detector 220 may classify a red grayscale value of 0, a green grayscale value of 255, and a blue grayscale value of 0 as the first color Color0, and a red grayscale value of 0, a green grayscale value of 0, and a blue grayscale value of 0 as the second color Color1. In addition, the pattern detector 220 may map the first color Color0 (upper left in this example) to 1 and the remaining second color Color1 to 0 to generate the mapping data.

Referring to FIG. 13, when the first pattern is detected, the first weight applier 230 may apply the luminance weight LW to the data voltages to determine the compensation data voltages. The first weight applier 230 may not apply the luminance weight LW to the data voltages when the first pattern is not detected.

For example, the first weight applier 230 may calculate the data voltages from the first voltage code VCODE1. The first weight applier 230 may determine whether to detect the first pattern based on the information PI on the pixel values. When the first pattern is detected, the first weight applier 230 may apply the luminance weight LW to the data voltages to determine the compensation data voltages, and generate the second voltage code VCODE2 corresponding to the determined compensation data voltages. When the first pattern is not detected, the first weight applier 230 may not apply the luminance weight LW to the data voltages.

When the first pattern is detected, the data driver 400 may receive the second voltage code VCODE2 and generate the compensation data voltages. When the first pattern is not detected, the data driver 400 may receive the first voltage code VCODE1 and generate data voltages.

Accordingly, the data driver 400 may apply the compensation data voltages to the pixels P when the first pattern is detected, and apply the data voltages to the pixels P when the first pattern is not detected.

For example, it is assumed that the data voltage for displaying a green grayscale value of 128 is 4V and the luminance weight LW for a green grayscale value of 128 is 1.1. In this case, the compensation data voltage for displaying a green grayscale value of 128 may be 4.4V (4V×1.1=4.4V). Accordingly, when the first pattern is not detected, a voltage of 4V may be applied to the green sub-pixel (G in FIG. 10) displaying a green grayscale value of 128, and when the first pattern is detected, a voltage of 4.4V may be applied to the green sub-pixel (G in FIG. 11) displaying a green grayscale value of 128.

Accordingly, each color may be compensated differently as described above, and the color coordinate shift occurring in the sub-checker pattern may be prevented.

Figure 15:
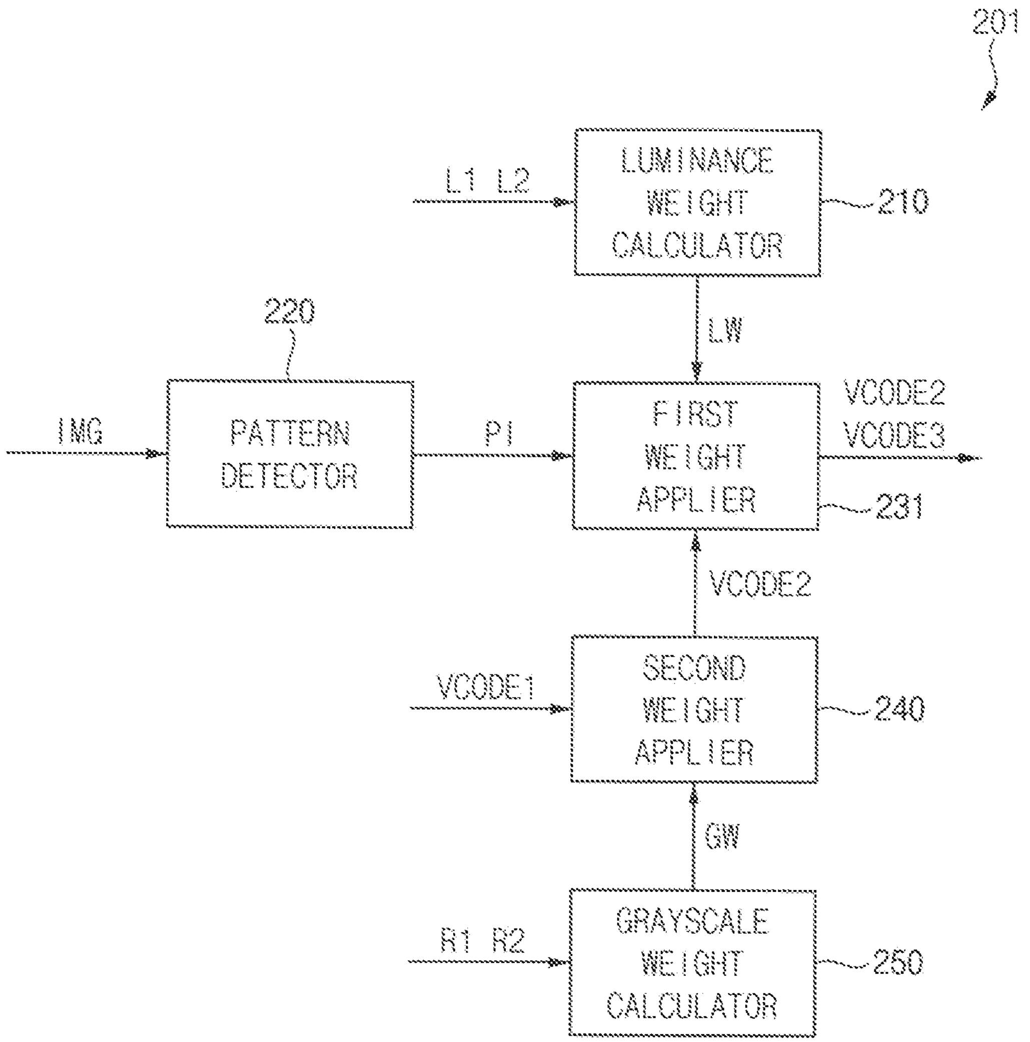
FIG. 15 is a block diagram illustrating an example of a timing controller of a display device according to embodiments of the present inventive concept.

FIG. 15 is a block diagram illustrating an example of a timing controller 201 of a display device according to embodiments of the present inventive concept. In FIG. 15, the first voltage code VCODE1 is a voltage code corresponding to the data voltages, the second voltage code VCODE2 is a voltage code corresponding to the first compensation data voltages, and a third voltage code VCODE3 is a voltage code corresponding to the second compensation data voltages.

The display device according to the present embodiment is substantially the same as the display device 1000 of FIG. 1 except for a first weight applier 231 (i.e., a first weight multiplier), a second weight applier 240 (i.e., a second weight multiplier), and a grayscale weight calculator 350. Thus, the same reference numerals are used to refer to the same or similar element, and any repetitive explanation thereof will be omitted.

Referring to FIGS. 1 and 15, the data driver 400 may receive the second control signal CONT2 and the data signal DATA from the timing controller 200. The data driver 400 may convert the data signal DATA into the first compensation data voltages (or, second compensation data voltages) of an analog signal. The data driver 400 may output the first compensation data voltages (or, the second compensation data voltages) to the data lines DL.

The timing controller 201 may detect the first pattern based on the input image data of the input image IMG, determine the luminance weight LW for each color based on the luminance L1 of the first pattern and the luminance L2 of the second pattern, determine a grayscale weight GW for each color based on a color ratio R1 of a current grayscale value and a color ratio R2 of a reference grayscale value, apply the grayscale weight GW to the data voltages to determine the first compensation data voltages, and apply the luminance weight LW to the first compensation data voltages to determine the second compensation data voltages when the first pattern is detected. The data driver 400 may apply the second compensation data voltages to the pixels.

The timing controller 201 may include the luminance weight calculator 210, the pattern detector 220, the first weight applier 231, the second weight applier 240, and a grayscale weight calculator 250.

The grayscale weight calculator 250 may determine the grayscale weight GW based on the color ratio R1 of the current grayscale and the color ratio R2 of the reference grayscale.

The color ratio may be a luminance ratio of each color in the white grayscale value. For example, when the luminance ratio of a red grayscale value of 255, a green grayscale value of 255, and a blue grayscale value of 255 is 0.21:0.70:0.09 in a white grayscale value of 255, the color ratio of a red grayscale value of 255 may be 0.21, the color ratio of a green grayscale value of 255 may be 0.70, and the color ratio of a blue grayscale value of 255 may be 0.09.

The color ratio of each grayscale value may be measured in advance, and the display device 1000 may store the measured values. The grayscale weight calculator 250 may calculate the grayscale weight GW based on the color ratio of each of the stored grayscale values.

For example, the grayscale weight GW may be calculated using Equation 2, $$GW=R1/R2, \qquad \text{[Equation 2]}$$

where GW is the grayscale weight, R1 is the color ratio of the current grayscale value, and R2 is the color ratio of the reference grayscale value. In an embodiment, the reference grayscale value may be the maximum grayscale. For example, when the color ratio of a green grayscale value of 128 is 0.77 and the color ratio of the green grayscale value of 255 (i.e., the maximum grayscale) is 0.70, the grayscale weight GW for a green grayscale value of 128 may be about 1.1. The grayscale weight GW may be different for each color.

The second weight applier 240 may apply the grayscale weight GW to the data voltages to determine the first compensation data voltages.

For example, the second weight applier 240 may determine the data voltages from the first voltage code VCODE1. The second weight applier 240 may apply the grayscale weight GW to the data voltages to determine the first compensation data voltages, and generate the second voltage code VCODE2 corresponding to the determined first compensation data voltages.

When the first pattern is detected, the first weight applier 231 may apply the luminance weight LW to the first compensation data voltages to determine the second compensation data voltages. The first weight applier 231 may not apply the luminance weight LW to the first compensation data voltages when the first pattern is not detected.

For example, the first weight applier 231 may calculate the first compensation data voltages from the second voltage code VCODE2. The first weight applier 231 may determine whether to detect the first pattern based on the information PI on the pixel values. When the first pattern is detected, the first weight applier 231 may apply the luminance weight LW to the first compensation data voltages to the second compensation data voltages, and generate the third voltage code VCODE3 corresponding to the determined second compensation data voltages. When the first pattern is not detected, the first weight applier 231 may not apply the luminance weight LW to the first compensation data voltages.

When the first pattern is detected, the data driver 400 may receive the third voltage code VCODE3 and generate the second compensation data voltage. When the first pattern is not detected, the data driver 400 may receive the second voltage code VCODE2 and generate the first compensation data voltages.

Therefore, the data driver 400 may apply the second compensation data voltages to the pixels P when the first pattern is detected, and apply the first compensation data voltages to the pixels P when the first pattern is not detected For example, it is assumed that the data voltage for displaying a green grayscale value of 128 is 4V, the grayscale weight GW for a green grayscale value of 128 is 1.1, and the luminance weight LW for a green grayscale value of 128 is 1.2. In this case, the first compensation data voltage for displaying a green grayscale of 128 value may be 4.4V (4V×1.1=4.4V). In addition, the second compensation data voltage for displaying the 128 green grayscale may be 5.28V (4.4V×1.2=5.28V). Accordingly, when the first pattern is not detected, a voltage of 4.4V may be applied to the green sub-pixel (G in FIG. 10) displaying a green grayscale value of 128, and when the first pattern is detected, a voltage of 5.28V may be applied to the green sub-pixel (G in FIG. 11) displaying a green grayscale value of 128.

Accordingly, each color may be compensated differently, and the color coordinate shift occurring in the sub-checker pattern may be prevented. Also, each color may be compensated differently, and the color coordinate shift caused by different luminous efficiency for each grayscale value may be prevented.

Figure 16:
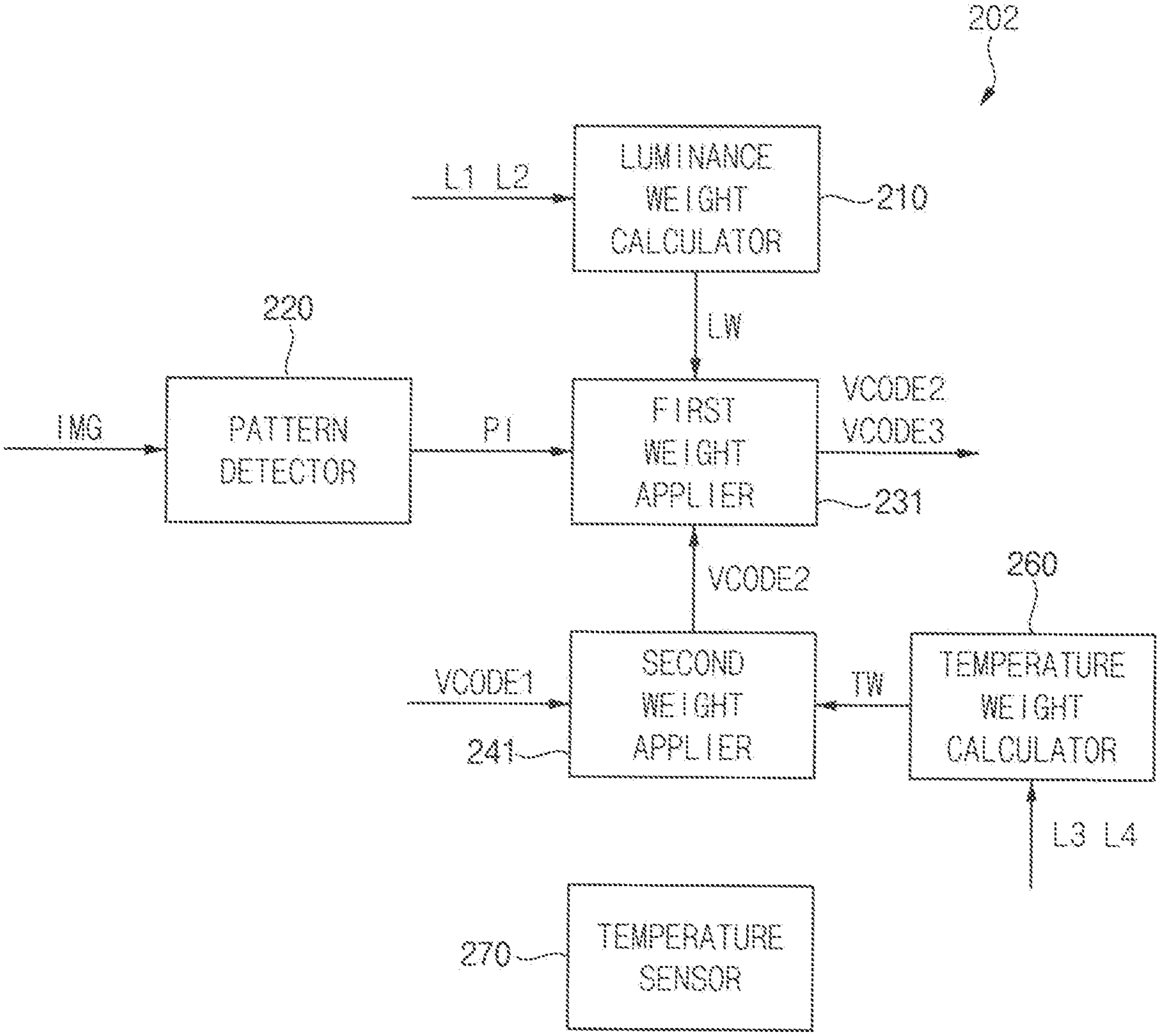
FIG. 16 is a block diagram illustrating an example of a timing controller of a display device according to embodiments of the present inventive concept.

FIG. 16 is a block diagram illustrating an example of a timing controller 202 of a display device according to embodiments of the present inventive concept. In FIG. 16, the first voltage code VCODE1 is a voltage code corresponding to the data voltages, the second voltage code VCODE2 is a voltage code corresponding to the first compensation data voltages, and the third voltage code VCODE3 is a voltage code corresponding to the second compensation data voltages.

The display device according to the present embodiment is substantially the same as the display device of FIG. 15 except for applying a temperature weight TW instead of the grayscale weight GW. Thus, the same reference numerals are used to refer to the same or similar element, and any repetitive explanation thereof will be omitted.

Referring to FIGS. 1 and 16, the timing controller 202 may detect the first pattern based on the input image data of the input image IMG, determine the luminance weight LW for each color based on the luminance L1 of the first pattern and the luminance L2 of the second pattern, determine the temperature weight TW for each color based on a luminance L3 at a room temperature and a luminance L4 at a current temperature, apply the temperature weight TW to the data voltages to determine the first compensation data voltages, and apply the luminance weight LW to the first compensation data voltages to determine the second compensation data voltages when the first pattern is detected. The data driver 400 may apply the second compensation data voltages to the pixels P.

In an embodiment, the luminance L3 at the room temperature may be a luminance for each grayscale value, and the luminance L4 at the current temperature may be a luminance for each grayscale value at the current temperature.

For example, the luminance L3 at the room temperature for a green grayscale value of 128 may be a luminance of the green sub-pixel G when a grayscale value of 128 is displayed at the room temperature, and the luminance L4 at the current temperature for the green grayscale value of 128 may be a luminance of the green sub-pixel G when the grayscale value of 128 is displayed at the current temperature.

The timing controller 202 may include the luminance weight calculator 210, a pattern detector 220, a first weight applier 231 (i.e., a first weight multiplier), a second weight applier 241 (i.e., a second weight multiplier), and a temperature weight calculator 260.

The temperature weight calculator 260 may determine the temperature weight TW based on the luminance L3 at the room temperature and the luminance L4 at the current temperature.

For example, the display device 1000 may include a temperature sensor 270, and may measure the current temperature through the temperature sensor. In an example, the display device 1000 may predict the current temperature based on the input image data of the input image IMG. Specifically, the display device 1000 may measure an ambient temperature of the display device through the temperature sensor, calculate a temperature rise based on a load of the input image data of the input image IMG, and add the temperature rise to the ambient temperature to predict the current temperature.

The luminance according to temperature may be measured in advance, and the display device 1000 may store the measured values. The temperature weight calculator 260 may calculate the temperature weight TW through the luminance according to the current temperature and the stored temperature.

For example, the temperature weight TW may be calculated using an Equation 3, $$TW=L3/L4, \quad \text{[Equation 3]}$$

where TW is the temperature weight, L3 is the luminance at the room temperature, and L4 is the luminance at the current temperature. For example, when the current temperature is 100° C., the luminance of a green grayscale value of 128 is 40 at 100° C., and the luminance of a green grayscale value of 128 is 44 at the room temperature, the temperature weight TW for a green grayscale value of 128 at 100° C. may be 1.1. The temperature weight TW may be different for each color.

The second weight applier 241 may apply the temperature weight TW to the data voltages to determine the first compensation data voltages.

For example, the second weight applier 241 may calculate the data voltages from the first voltage code VCODE1. The second weight applier 241 may apply the temperature weight TW to the data voltages to determine the first compensation data voltages, and generate the second voltage code VCODE2 corresponding to the determined first compensation data voltages.

When the first pattern is detected, the first weight applier 231 may apply the luminance weight LW to the first compensation data voltages to determine the second compensation data voltages. The first weight applier 231 may not apply the luminance weight LW to the first compensation data voltages when the first pattern is not detected.

For example, the first weight applier 231 may determine the first compensation data voltages from the second voltage code VCODE2. The first weight applier 231 may determine whether to detect the first pattern based on the information PI on the pixel values. When the first pattern is detected, the first weight applier 231 may apply the luminance weight LW to the first compensation data voltages to determine the second compensation data voltages, and generate the third voltage code VCODE3 corresponding to the determined second compensation data voltages. When the first pattern is not detected, the first weight applier 231 may not apply the luminance weight LW to the first compensation data voltages.

When the first pattern is detected, the data driver 400 may receive the third voltage code VCODE3 and generate the second compensation data voltages. When the first pattern is not detected, the data driver 400 may receive the second voltage code VCODE2 and generate the first compensation data voltages.

Accordingly, the data driver 400 may apply the second compensation data voltages to the pixels P when the first pattern is detected, and apply the first compensation data voltages to the pixels P when the first pattern is not detected.

For example, it is assumed that the data voltage for displaying a green grayscale of 128 value is 4V, the current temperature is 100° C., the temperature weight TW for a green grayscale value of 128 at 100° C. is 1.1, and the luminance weight LW for a green grayscale value of 128 is 1.2. In this case, the first compensation data voltage for displaying a green grayscale value of 128 may be 4.4V (4V×1.1=4.4V). And, the second compensation data voltage for displaying a green grayscale value of 128 may be 5.28V (4.4V×1.2=5.28V). Accordingly, when the first pattern is not detected, a voltage of 4.4V may be applied to the green sub-pixel (G in FIG. 10) displaying a green grayscale value of 128, and when the first pattern is detected, a voltage of 5.28V may be applied to the green sub-pixel (G in FIG. 11) displaying a green grayscale value of 128.

Accordingly, each color may be compensated differently, and the color coordinate shift occurring in the sub-checker pattern may be prevented. Also, each color may be compensated differently, and the color coordinate shift caused by different luminous efficiency for temperature value may be prevented.

Figure 17:
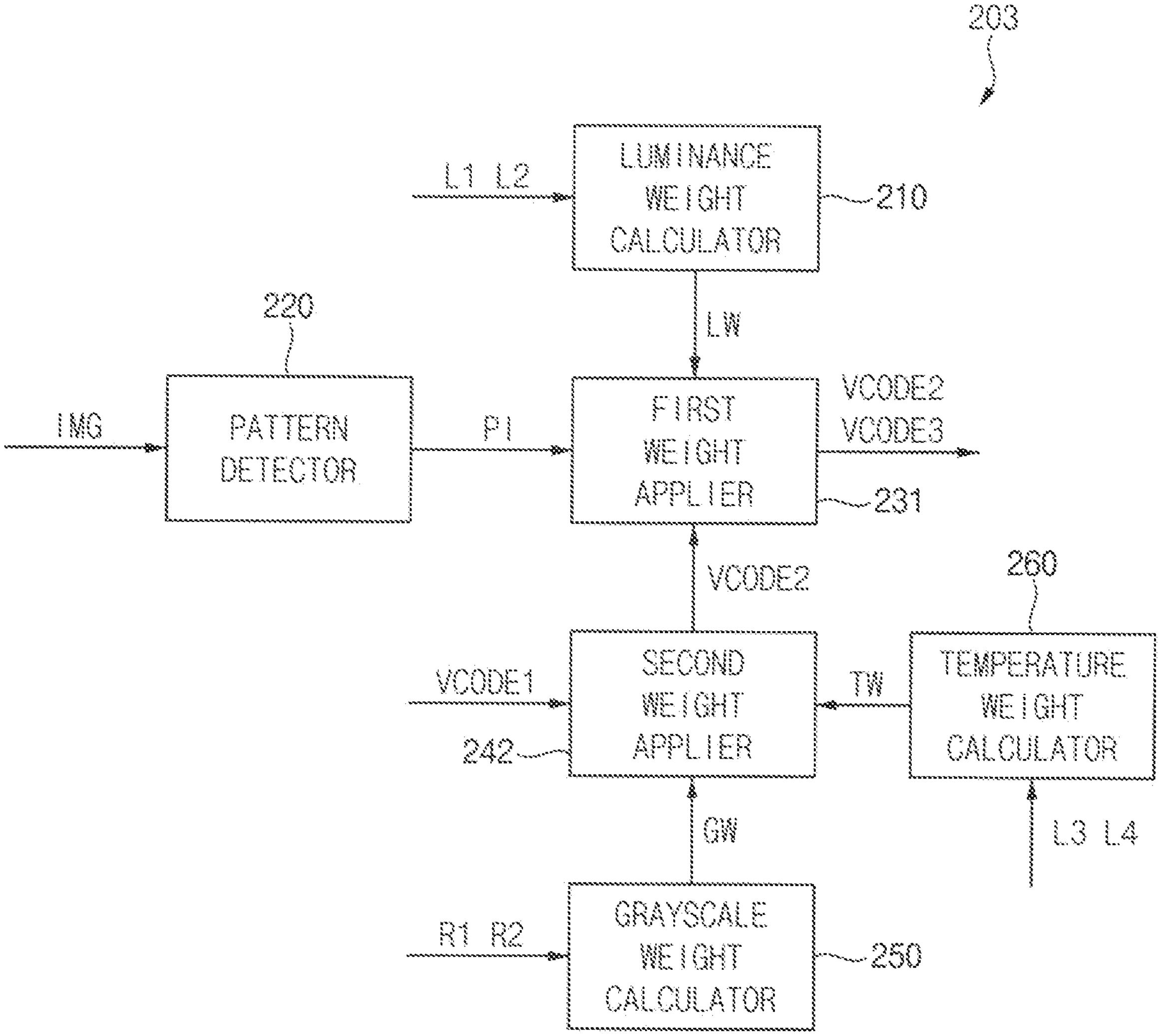
FIG. 17 is a block diagram illustrating an example of a timing controller of a display device according to example embodiments.

FIG. 17 is a block diagram illustrating an example of a timing controller 203 of a display device according to embodiments of the present inventive concept. In FIG. 17, the first voltage code VCODE1 is a voltage code corresponding to the data voltages, the second voltage code VCODE2 is a voltage code corresponding to the first compensation data voltages, and the third voltage code VCODE3 is a voltage code corresponding to the second compensation data voltages.

The display device according to the present embodiment is substantially the same as the display device of FIG. 15 except for applying the temperature weight TW. Thus, the same reference numerals are used to refer to the same or similar element, and any repetitive explanation thereof will be omitted.

Referring to FIGS. 1 and 17, the timing controller 203 may detect the first pattern based on the input image data of the input image IMG, determine the luminance weight LW for each color based on the luminance L1 of the first pattern and the luminance L2 of the second pattern, determine the grayscale weight GW based on the color ratio of the current grayscale value and the color ratio of the reference grayscale value, determine the temperature weight TW for each color based on a luminance L3 at a room temperature and a luminance L4 at a current temperature, apply the temperature weight TW and the grayscale weight GW to the data voltages to determine the first compensation data voltages, and apply the luminance weight LW to the first compensation data voltages to determine the second compensation data voltages when the first pattern is detected. The data driver 400 may apply the second compensation data voltages to the pixels P.

The timing controller 203 may include the luminance weight calculator 210, a pattern detector 220, a first weight applier 231 (i.e., a first weight multiplier), a second weight applier 242 (i.e., a second weight multiplier), the grayscale weight calculator 250, and the temperature weight calculator 260.

Since the temperature weight TW is described with reference to FIG. 16, and duplicated description related thereto will not be repeated.

The second weight applier 242 may apply the grayscale weight GW and the temperature weight TW to determine the first compensation data voltages.

For example, it is assumed that the data voltage for displaying a green grayscale value of 128 is 4V, the current temperature is 100° C., the temperature weight TW for a green grayscale value of 128 at 100° C. is 1.1, and the grayscale weight GW for a green grayscale value of 128 is 1.1, and the luminance weight LW for a green grayscale value of 128 is 1.2. In this case, the first compensation data voltage for displaying a green grayscale value of 128 may be 4.84V (4V×1.1×1.1=4.84V). In addition, the second compensation data voltage for displaying a green grayscale value of 128 may be 5.808V (4.84V×1.2=5.808V). Accordingly, when the first pattern is not detected, a voltage of 4.84 V may be applied to the green sub-pixel (G in FIG. 10) displaying a green grayscale value of 128, and when the first pattern is detected, a voltage of 5.808V may be applied to the green sub-pixel (G in FIG. 11) displaying a green grayscale value of 128.

Accordingly, each color may be compensated differently, and the color coordinate shift occurring in the sub-checker pattern may be prevented. Also, each color may be compensated differently, and the color coordinate shift caused by different luminous efficiency for each grayscale value may be prevented. And, each color may be compensated differently, and the color coordinate shift caused by different luminous efficiency for temperature value may be prevented.

Figure 18:
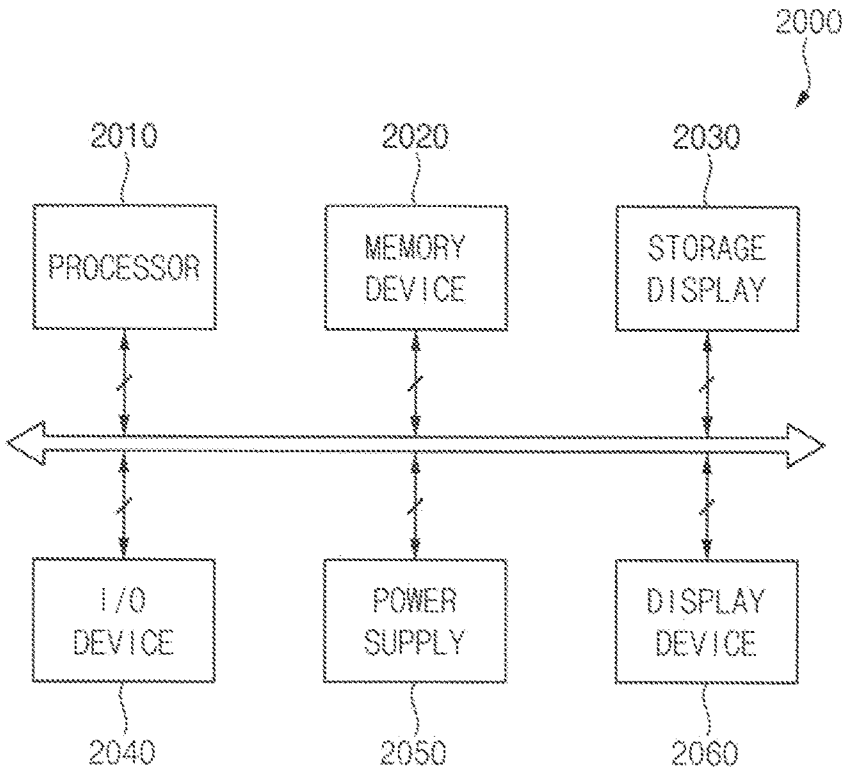
FIG. 18 is a block diagram showing an electronic device according to embodiments of the present inventive concept.
Figure 19:
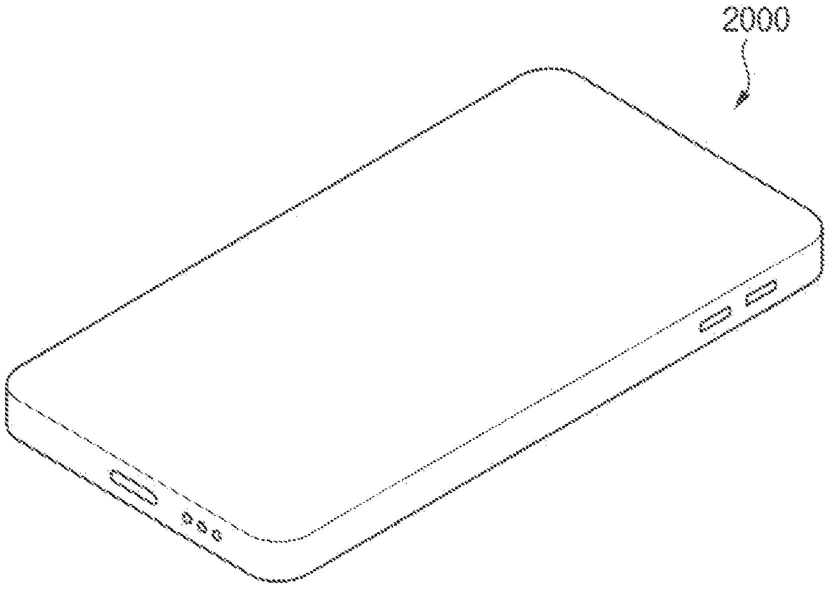
FIG. 19 is a diagram showing an example in which the electronic device of FIG. 18 is implemented as a smart phone.

FIG. 18 is a block diagram showing an electronic device according to embodiments of the present inventive concept, and FIG. 19 is a diagram showing an example in which the electronic device of FIG. 18 is implemented as a smart phone.

Referring to FIGS. 18 and 19, the electronic device 2000 may include a processor 2010, a memory device 2020, a storage device 2030, an input/output (I/O) device 2040, a power supply 2050, and a display device 2060. Here, the display device 2060 may be the display device 1000 of FIG. 1. In addition, the electronic device 2000 may further include a plurality of ports for communicating with a video card, a sound card, a memory card, a universal serial bus (USB) device, other electronic devices, etc. In an embodiment, as shown in FIG. 19, the electronic device 2000 may be implemented as a smart phone. However, the electronic device 2000 is not limited thereto. For example, the electronic device 2000 may be implemented as a cellular phone, a video phone, a smart pad, a smart watch, a tablet PC, a car navigation system, a computer monitor, a laptop, a head mounted display (HMD) device, etc.

The processor 2010 may perform various computing functions. The processor 2010 may be a micro processor, a central processing unit (CPU), an application processor (AP), etc. The processor 2010 may be coupled to other components via an address bus, a control bus, a data bus, etc. Further, the processor 2010 may be coupled to an extended bus such as a peripheral component interconnection (PCI) bus.

The memory device 2020 may store data for operations of the electronic device 2000. For example, the memory device 2020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile DRAM device, etc.

The storage device 2030 may include a solid state drive (SSD) device, a hard disk drive (HDD) device, a CD-ROM device, etc.

The I/O device 2040 may include an input device such as a keyboard, a keypad, a mouse device, a touch pad, a touch screen, etc., and an output device such as a printer, a speaker, etc. In some embodiments, the I/O device 2040 may include the display device 2060.

The power supply 2050 may provide power for operations of the electronic device 2000. For example, the power supply 2050 may be a power management integrated circuit (PMIC).

The display device 2060 may display an image corresponding to visual information of the electronic device 2000. For example, the display device 2060 may be an organic light emitting display device or a quantum dot light emitting display device, but is not limited thereto. The display device 2060 may be coupled to other components via the buses or other communication links. Here, the display device 2060 may reduce the falling time of the scan signal. Accordingly, the display device may reduce an overlapping time of scan signals outputted to different gates at the falling times of the scan signals. And, the display device may compensate for luminance according to the pattern. Accordingly, the color coordinate shift occurring in the first pattern may be prevented.

The inventive concepts may be applied to any electronic device including the display device. For example, the inventive concepts may be applied to a television (TV), a digital TV, a 3D TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

The foregoing is illustrative of the present inventive concept and is not to be construed as limiting thereof. Although some embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display device comprising:

a display panel including pixels of a plurality of colors; and a display panel driver configured to:

receive an input image, detect a pattern formed of only two pixel values from input image data of the input image, generate, in response to detecting of the pattern, information on the two pixel values of the pattern, detect whether the pattern is a first pattern based on the information on the two pixel values of the pattern, determine a luminance weight for each of the plurality of colors based on a luminance of the input image of the first pattern, based on stored predetermined luminance values for the first pattern, and a luminance of a reference image of a second pattern, based on stored predetermined luminance values for the second pattern, apply, in response to detecting of the first pattern, the luminance weight for each of the plurality of colors to data voltages to determine compensation data voltages for each of the plurality of colors, and apply the compensation data voltages for each of the plurality of colors to the respective pixels.

2. The display device of claim 1, wherein the first pattern is a sub-checker pattern.

3. The display device of claim 1, wherein the first pattern of the input image has a size of N×M, where N and M are positive integers greater than or equal to 2 and correspond to a number of pixel rows and a number of pixel columns in the input image, respectively.

4. The display device of claim 1, wherein the second pattern of the reference image is a full white pattern.

5. The display device of claim 1, wherein the luminance weight is calculated using an equation $LW=(L2/2)/L1$, where LW is the luminance weight, L1 is the luminance of the input image of the first pattern, and L2 is the luminance of the reference image of the second pattern.

6. A display device comprising:

a display panel including a plurality of pixels; and a display panel driver configured to:

receive an input image, detect a pattern formed of only two pixel values from input image data of the input image, generate, in response to detecting of the pattern, information on the two pixel values of the pattern, detect whether the pattern is a first pattern based on the information on the two pixel values of the pattern, determine a luminance weight for each color based on a luminance of the input image and a luminance of a reference image having a second pattern, determine a grayscale weight for each color based on a color ratio of a current grayscale value of the input image and a color ratio of a reference grayscale value of the reference image, wherein the color ratio of the current grayscale value of the input image is a luminance ratio of each color in a white grayscale value of each pixel in the input image, and wherein the color ratio of the reference grayscale value of the reference image is a luminance ratio of each color in a white grayscale value of each pixel in the reference image, apply the grayscale weight to data voltages to determine a first compensation data voltages, apply, in response to detecting of the first pattern, the luminance weight to the first compensation data voltages to determine second compensation data voltages, and apply the second compensation data voltages to the pixels.

7. The display device of claim 6, wherein the first pattern is a sub-checker pattern.

8. The display device of claim 6, wherein the first pattern of the input image has a size of N×M, where N and M are positive integers greater than or equal to 2 and correspond to a number of pixel rows and a number of pixel columns in the input image, respectively.

9. The display device of claim 6, wherein the second pattern is a full white pattern.

10. The display device of claim 6, wherein the luminance weight is calculated using an equation LW=(L2/2)/L1, where LW is the luminance weight, L1 is the luminance of the input image of the first pattern, and L2 is the luminance of the reference image of the second pattern.

11. The display device of claim 6, wherein the reference grayscale value is a maximum grayscale value.

12. The display device of claim 6, wherein the grayscale weight is calculated using an equation GW=R1/R2, where GW is the grayscale weight, R1 is the color ratio of the current grayscale value of the input image, and R2 is the color ratio of the reference grayscale value of the reference image.

13. The display device of claim 6, further comprising:

a temperature sensor to measure a current temperature of the display device, wherein the display panel driver is configured to:

determine a temperature weight for each color based on a luminance for each grayscale value at a room temperature and a luminance for each grayscale value at the current temperature, and apply the temperature weight and the grayscale weight to the data voltages to determine the first compensation data voltages.

14. The display device of claim 13, wherein the temperature weight is calculated using an equation TW=L3/L4, where TW is the temperature weight, L3 is the luminance for each grayscale value at the room temperature, and L4 is the luminance for each grayscale value at the current temperature.

15. A display device comprising:

a display panel including pixels; and a display panel driver configured to:

receive an input image, detect a pattern formed of only two pixel values from input image data of the input image, generate, in response to detecting of the pattern, information on the two pixel values of the pattern, detect whether the pattern is a first pattern based on the information on the two pixel values of the pattern, determine a luminance weight for each color based on a luminance of the input image of the first pattern and a luminance of a reference image of a second pattern, determine a temperature weight for each color based on a luminance for each grayscale value at a room temperature and a luminance for each grayscale value at a current temperature, apply the temperature weight to data voltages to determine a first compensation data voltages, apply, in response to detecting of the first pattern, the luminance weight to the first compensation data voltages to determine second compensation data voltages, and apply the second compensation data voltages to the pixels.

16. The display device of claim 15, wherein the first pattern is a sub-checker pattern.

17. The display device of claim 15, wherein the first pattern of the input image has a size of N×M, where N and M are positive integers greater than or equal to 2 and correspond to a number of pixel rows and a number of pixel columns in the input image, respectively.

18. The display device of claim 15, wherein the second pattern is a full white pattern.

19. The display device of claim 15, wherein the luminance weight is calculated using an equation LW=(L2/2)/L1, where LW is the luminance weight, L1 is the luminance of the first pattern, and L2 is the luminance of the second pattern.

20. The display device of claim 15, wherein the temperature weight is calculated using an equation TW=L3/L4, where TW is the temperature weight, L3 is the luminance for each grayscale value at the room temperature, and L4 is the luminance for each grayscale value at the current temperature.

* * * * *